(12) United States Patent
Willrett

(10) Patent No.: US 6,430,397 B1
(45) Date of Patent: Aug. 6, 2002

(54) METHOD AND DEVICE FOR MEASURING THE TRANSMISSION QUALITY IN CELLS OF MOBILE RADIO NETWORKS

(75) Inventor: Ursel Willrett, Gerlingen (DE)

(73) Assignee: Wandel & Goltermann Management Holding GmbH, Eningen (DE)

( * ) Notice: Subject to any disclaimer, the term of this patent is extended or adjusted under 35 U.S.C. 154(b) by 0 days.

(21) Appl. No.: 09/268,625

(22) Filed: Mar. 15, 1999

(30) Foreign Application Priority Data

Mar. 27, 1998 (DE) .......................................... 198 13 564

(51) Int. Cl.$^7$ .......................... H04B 17/00; H04Q 7/20
(52) U.S. Cl. .................... 455/67.1; 455/456; 455/67.4; 455/423; 342/357.06
(58) Field of Search ................................ 455/67.1, 456, 455/423, 67.4, 115, 226.1; 342/450, 457, 357.06; 701/213, 214, 215

(56) References Cited

U.S. PATENT DOCUMENTS

| 5,563,607 A | * 10/1996 | Loomis et al. | 342/357 |
|---|---|---|---|
| 5,764,184 A | * 6/1998 | Hatch et al. | 342/357 |
| 5,841,026 A | * 11/1998 | Kirk et al. | 73/178 R |
| 5,987,306 A | * 11/1999 | Nilsen et al. | 455/67.1 |

FOREIGN PATENT DOCUMENTS

| DE | 19533472 | 3/1997 |
| DE | 19803960 | 8/1998 |
| EP | 0668667 | 8/1995 |
| EP | 0682416 | 11/1995 |
| WO | 9723109 | 6/1997 |

OTHER PUBLICATIONS

Mathauer, Veit: Optimale Funkzellenplanung. In: net, 46, 1992, H. 6, S.317, 318, 320.
Rosar, Werner: Teststrategien, Meßgeräte und—systeme im GSM—Teil 1. In: ntz, Bd. 47, 1994, H.9, S.654–659.
Rosar, Werner: Teststrategien, Meßgeräte und—systeme im GSM—Teil 1. ntz, Bd. 47, 1994, H.10, S.726–730, 732.
JP 6–244782 A., In: Patent Abstracts of Japan, E–1637, Nov. 30, 1994, vol. 18, No. 629.

* cited by examiner

Primary Examiner—Edward F. Urban
Assistant Examiner—Erika A. Gary
(74) Attorney, Agent, or Firm—Bachman & LaPointe, P.C.

(57) ABSTRACT

Method and device for measuring the transmission quality in cells of mobile radio networks in which, using a mobile station (MS) comprising a GPS receiver, the cell to be measured is travelled through, and the geographic position and the time are recorded at specified intervals. The signals transmitted from a base transmission station (BTS) to the mobile station as well as a call build-up signal sent at certain intervals, are stored with the GPS position. Furthermore, signals between the base transmission station and the respective mobile station, which signals are sent at specified intervals, are recorded with time stamps by means of a mobile radio analysis device (MA). Subsequently there is a mixing together of the recorded data of the mobile station with the recorded data of the mobile radio analysis device, sorted according to time stamp, with the measured results issued by geographic position and by time. The device and the method make it possible: to acquire the measuring values for both directions; to obtain the geographic position of a problem or to obtain position-related statistics and better information concerning the supply within the cell. Furthermore it is no longer necessary for highly-qualified employees to travel through the cell in a test vehicle.

3 Claims, 2 Drawing Sheets

METHOD AND DEVICE FOR MEASURING THE TRANSMISSION QUALITY IN CELLS OF MOBILE RADIO NETWORKS

BACKGROUND OF THE INVENTION

The present invention relates to a method and a device for measuring the transmission quality in cells of mobile radio networks, to make it possible for the network operator to find positions within the cells of the global system for mobile communication (GSM), where the transmission quality is poor.

Structure and organization of a GSM network divided into individual cells as the smallest geographic radio coverage area, served by a base supply station (BTS), is for example known from the book "Mobilfunk und intelligente Netze" by Jatzek gala, Vieweg Verlag 1994, ISEN 3-528-05302-X. [Translation of the title of this German-language publication "Mobile radio and intelligent networks".] Due to local topography and man-made surroundings, time and again disturbances can occur, both within the cells and when crossing individual cells. Such disturbances lead to dissatisfaction in the case of the users of the mobile radio network and are also undesirable from the point of view of network operators.

In order to find these disturbance zones, measurements are undertaken either from a vehicle, by means of mobile test systems, or from the network. Both measuring methods have certain limitations. The main disadvantage of undertaking measuring from a vehicle is that a qualified person has to travel in the vehicle through the cells; that measuring in one direction only, namely the direction to the vehicle, is possible; and that qualifying the cells i s very time-intensive. The main disadvantage in measuring from the network is that no geographic position can be acquired with the measurement, so that no detailed statement is possible about the geographic location in the disturbance zone.

SUMMARY OF THE INVENTION

It is thus the object of the present invention to propose a method and a device which does not require the use of highly-qualified employees to travel around in the cell to be measured, and which can provide precise information concerning the transmission quality within a cell.

According to the invention, this object is met by the method and device of the present invention. With the characteristics according to claim 1, as well as by a device with the characteristics of claim 7. Further advantageous embodiments of the method and the device are provided in the respective dependent claims.

According to the method, the cells to be measured are travelled through, using a mobile radio station (MS) and a GPS receiver, and the geographic position and the time are recorded at specified intervals. The mobile station is a normal receiving device, for example a mobile telephone, which consists of the known functional groups of mobile terminal, terminal adapter and terminal equipment. In addition, this device comprises a receiving device which is able to receive the geographic position beamed by satellites as well as the local time, based on the so-called global positioning system (GPS). This mobile station can for example be located in the boot of a vehicle, including a taxi or a bus. In specified intervals it records the GPS time and the geographic position where the vehicle is at present. In addition, in specified time intervals, call build-up signals of any terminal are sent to the mobile station (MS) via a base transmission station (BTS) or vice-versa, and the GPS position for each call build-up signal is stored in the mobile station. The base transmission station is a base transmission station belonging to the cell to be examined. After the connection has been established, it is automatically interrupted after a specified time and established anew, so as to minimize synchronization errors. At the same time, the signals are recorded which were sent at specified intervals via the BTS to the respective MS, and concurrently the time stamp of the mobile radio analysis device is recorded. The data obtained in this way are mixed together, sorted according to the time stamps. Subsequently the measured results are issued by geographic position and time. Thus, based on the exact geographic position obtained, an analysis of the network by means of the mobile radio analysis device can be carried out regarding the parameters usual for qualitative assessment.

Sorting of the recorded data according to time stamp is such that to each of the signals recorded by the mobile radio analysis device, that position is allocated which, by comparing the time stamp of the mobile station and the mobile radio analysis device, is nearest to the position of the entire signal.

Due to the clock pulses in the mobile station possibly differing from those in the mobile radio analysis device, according to a preferred embodiment, taking into account the GPS clock pulse as the master time, the internal clock pulse of the mobile station and of the mobile radio analysis device is synchronized. The clock pulses of the mobile radio analysis device are determined by the PCM clock pulses of the measuring interface (Abis interface). Correction of the time stamp of the mobile station and the mobile radio analysis device is according to the condition $tx_{corr}=tx+(t_{GPS}-t_q)/n \times x$, where $t_{GPS}$ is the time within a GPS period which for example can be assumed to be one second, because the GPS sends a signal every second; $t_q$ is the stretch of time which the respective measuring unit measures whose time stamp is to be corrected while the GPS travels exactly this one second; tx is the time stamp to be corrected, i.e. the asynchronous message which is not received in the one-second grid of the GPS. This message is corrected in that time intervals are placed within a GPS period, with the time intervals x being selected in such a way that they fairly closely approximate the measured time stamp. x indicates the number of the interval in which the time stamp resides which is to be corrected with respect to the interval. Correction takes place according to the formula with the total number n of all intervals. As mentioned above, the interval length has to be determined, depending on requirements (division of the GPS period of one second into for example 1,000, 100 or only 10 intervals).

In order to also compensate for time delays regarding the time stamp, which time delays can occur due to transmitting the data from the BTS to the MS, according to a further preferred embodiment, prior to sorting the recorded data and after synchronization with the GPS clock pulse, the time stamp of an identical signal of the MS and the mobile radio analysis device is compared, and if there is a difference, the difference is added to the time stamps of the MS as a transmission delay.

For evaluation, the recorded data of the mobile station can be transmitted to the mobile radio analysis system, via the global system for mobile communications. This saves time and effort compared to recording the data on a diskette before feeding it to the mobile radio analysis device.

The device consists of at least one mobile station comprising a GPS receiver for determining the geographic position of the mobile station and the GPS time and a recording unit for recording the geographic position and the respective time in specified intervals as well as the time when a call build-up signal was received. The device further comprises a mobile radio analysis device which by means of an interface (Abis interface) is switchable between one or several base transmission stations (BTS) and the respective base station controls (BSC). The mobile radio analysis device (MA) further comprises a GPS receiver for determining the geographic position and the time; in particular in order to synchronize the GPS time as a master time for sychronizing the internal MA time, based on the Abis time. Furthermore, the MA comprises a data recording unit for recording and storing the transmitted data and time stamps between at least one of the base transmission stations and one of the mobile stations, a data evaluation device for mixing together the recorded data of the mobile station with the recorded transmitted data, and a data unit for issuing the transmitted data by geographic position in the mobile station and by time.

Based on the method according to the invention, it is thus possible to obtain all measured values for both directions (uplink and downlink) as well as better information concerning the supply of the cell. In addition, the geographic position of a problem can easily be determined, or statistics can be produced by positions, using the known information which can be issued by way of the mobile radio analysis device. It is no longer necessary to use highly qualified employees in a mobile test station.

BRIEF DESCRIPTION OF THE DRAWINGS

Below, the invention is illustrated in more detail with accompanying drawings showing one embodiment only, as follows.

DETAILED DESCRIPTION OF PREFERRED EMBODIMENT

Figure 1:
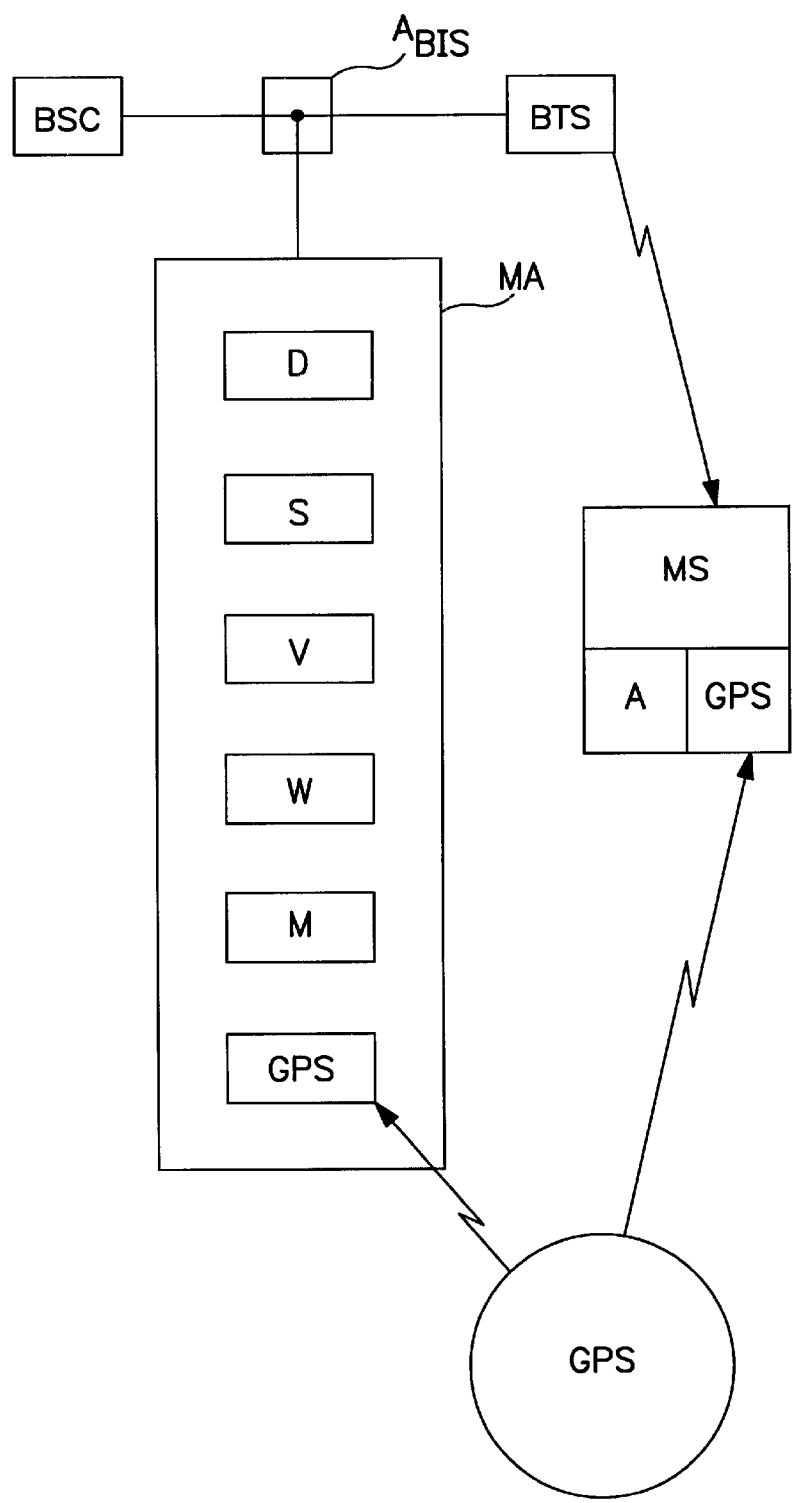
FIG. 1 is a block diagram showing the device which includes only one mobile station and the link between the mobile radio analysis device to the mobile radio network.
Figure 2:
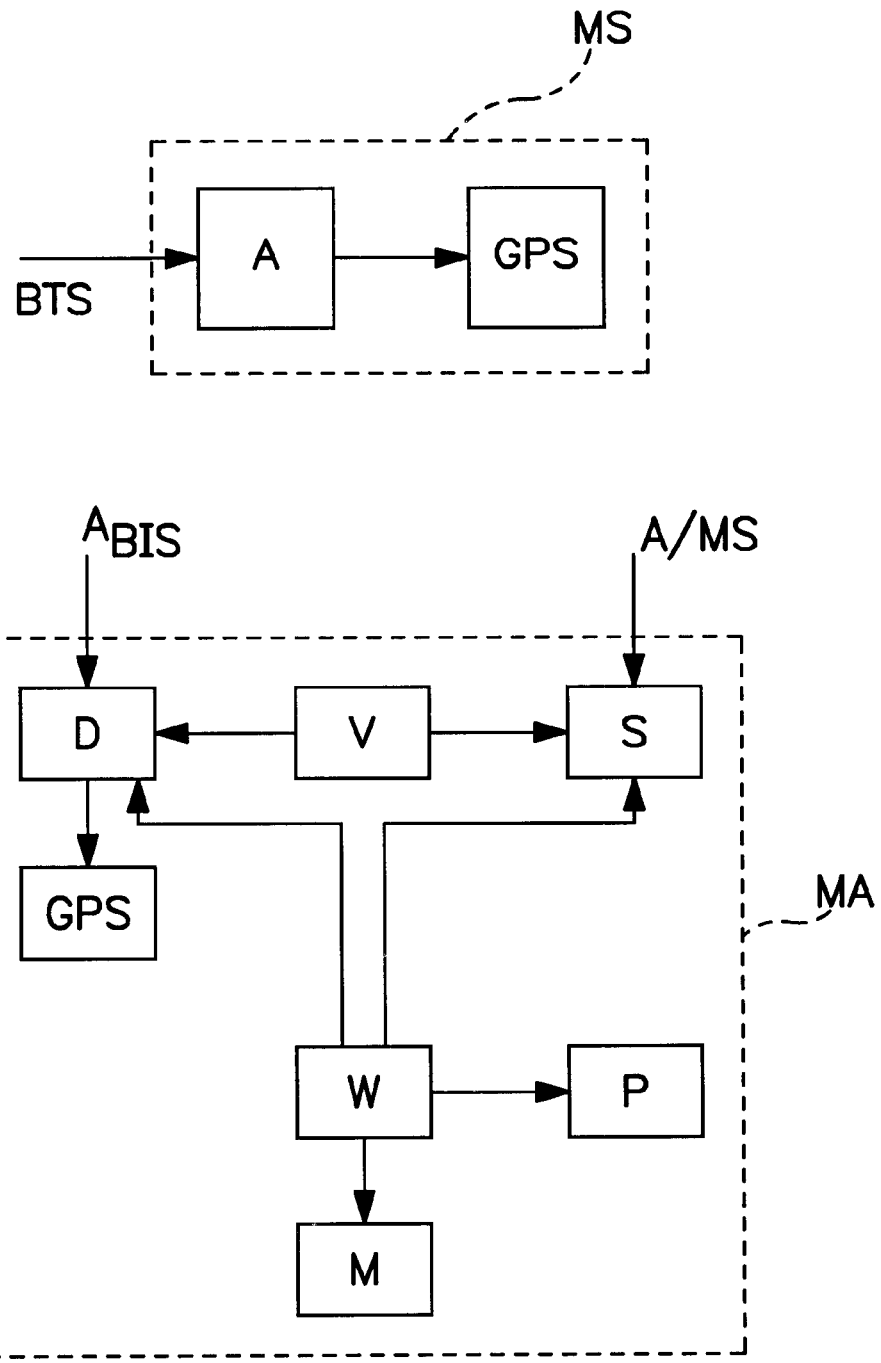
FIG. 2 is a block diagram illustrating the functional connection of the individual devices arranged in the mobile radio analysis device and in the mobile station.

FIGS. 1 and 2 diagrammatically show the individual allocations and functions of the individual units. These are explained below with reference to the figures.

A vehicle accommodating a mobile station, for example a mobile telephone, is required for carrying out the measurements. Apart from the equipment usual with such devices, the mobile station requires a GPS receiver able to receive on the basis of the GPS system, the information concerning geographic position and time which is beamed by satellites. The mobile system can either be carried in test vehicles or in buses or taxis. By means of a recording unit A, the GPS time and the geographic position is stored in the mobile system. Storage can for example be on a diskette or in a storage or memory device which can be called up again via the mobile telephone network. The mobile station is able to call out automatically, or it is called up with the respective number over the mobile network by an automatic device. After successful call build-up, the connection is terminated after a specified time. With every call build-up signal and with every measuring report created by the GPS system, the GPS position is stored.

When preparing a measuring report, for example every 480 ms, the resolution depends on the speed of the vehicle accommodating the mobile station. The accuracy depends on the GPS receiver. In the following example, accuracy is assumed to be 5 m, thus resulting in the following resolution:

| Speed in km/h   | 0 | 20  | 50  | 100  | 200  |
|-----------------|---|-----|-----|------|------|
| Resolution in m | 0 | 2.7 | 6.7 | 13.4 | 26.7 |

The respective mobile radio analysis device MA is a known mobile radio analysis device MA10 by the applicant, with an additional GPS receiver which controls the absolute time. The absolute time is the time stamp with which recording is started. During recording, all messages are provided with a time stamp which relates to the PCM connection (Pulse Code Modulation). All messages are acquired and stored in the data recording unit D. After storage, the transmitted data is combined with the data of the mobile station, sorted by time stamp. To do so, the data is either transmitted from the mobile station over the network, or else read-in by diskette and stored in the storage unit S.

Calls are recorded in the mobile radio analysis device MA where all signal data including a specified telephone number or a set of telephone numbers are acquired.

For time synchronization due to the differences between the GPS time and the internal time of the mobile station as well as the Abis interface, both in the mobile station MS and in the mobile radio analysis device MA, the recording unit A or the data recording unit D accesses the respective GPS receiver and determines a corrected GPS time according to the formula $tx_{corr}=tx+(t_{GPS}-t_q)/n \times x$.

After the data supplied by the mobile station has been stored in the mobile radio analysis device, the comparison device V can compare the time stamps of an identical signal of the mobile station and the mobile radio analysis device, and if there is a difference, can add this difference as a transmission delay to the time stamp of the mobile station.

Assuming such a correction as has just been mentioned is not required, the mobile station and the mobile radio analysis device can prepare the following data tables:

| Event         | Time stamp     | Pos. x   | Pos. y  |
|---------------|----------------|----------|---------|
|               | Mobile station |          |         |
| GPS           | 12:05:49.367   | 48.49.12 | 9.00.34 |
| GPS           | 12:05:59.367   | 48.49.23 | 9.00.25 |
| CALL BUILD-UP | 12:06.02.317   | 48.49.23 | 9.00.25 |
| GPS           | 12:06:09.367   | 48.49.56 | 9.00.38 |
| .             | .              | .        | .       |
| .             | .              | .        | .       |
| .             | .              | .        | .       |
| GPS           | 12:31:39.367   | 49:00:63 | 9.00.41 |
|               | Mobile radio analysis station |  |  |
| MSG1          | 12:01:41.951   |          |         |
| MSG2          | 12:05:29.443   |          |         |
| CALL BUILD-UP | 12:06:02.317   |          |         |
| MSG3          | 12:06:03.725   |          |         |
| .             | .              |          |         |
| .             | .              |          |         |
| MSGn          | 12:15:58:888   |          |         |

A standard GPS unit creates a new set of data every second. The table for the mobile system consists of rows in which the data is taken straight from the GPS system (marked by the event "GPS"). The other rows contain transmission events which are asynchronous to the GPS events. For the transmission events, the respective time stamps are taken over from the internal time of the mobile station and subsequently, as previously mentioned, are synchronized by the GPS system. The respective geographic position for the respective transmission event is taken from the last GPS event. So as to avoid any wrong connections, the call build-up signal for the respective mobile station, which signal apart from a SETUP signal contains a few other parameters and also the telephone number, is selected for entry into the above table.

The table of the mobile radio analysis station contains transmission information which by comparison with the regular GPS clock pulses is irregular and unpredictable. As mentioned above, the time stamp is resychronized by the GPS system.

In the evaluation device W, the final data is now mixed together according to the following table:

| Event | Time stamp | Pos. x | Pos. y |
|---|---|---|---|
| MSG1 | 12:01:41.951 | 48.48.51 | 9.00.52 |
| MSG2 | 12:05:29.443 | 48.49.12 | 9.00.34 |
| CALL BUILD-UP | 12:06.02.317 | 48.49.23 | 9.00.25 |
| MSG3 | 12:06:03.725 | 48.49.56 | 9.00.38 |
| . | . | . | . |
| . | . | . | . |
| . | . | . | . |
| MSGn | 12:15:58.888 | 49:00:63 | 9.00.41 |

In the table, the positions x and y are added to the mobile radio analysis device in that the time stamps of both tables are compared and listed consecutively. The messages MSG contain the position where the time stamps of both tables best correlate.

After this, the above table can be issued with a respective output device for example a display M or a printer P.

Due to these values determined, further applications can be opened up which are provided via the mobile radio analysis device MA. This device can for example generate various statistical information concerning the cells and/or the calls from the position of the Abis interface.

Together with the geographic position, significantly more complex results can be generated. They can for example be represented in ASCII tables for further processing or in x/y graphs. The points measured mark a geographic position in which a previously specified event occurred. Thus for example the quality of transmission can be represented separately, according to uplink/downlink results. Further options for known evaluations taking into account the geographic position include:

call attempts/call successes per location
unsuccessful transfer attempts/transfer calls per location
abnormal call terminations/call transfer terminations per location
call transfer cases per location
interference analysis
island analysis
combination of the Abis interface call recording with the geographic position
correlation of the call recording between the Abis interface and the mobile station.

What is claimed is:

1. A method for measuring the transmission quality in cells of mobile radio networks, comprising the following steps:

a) Travelling through the cell to be measured, using a mobile station (MS) and a globar positioning system receiver, and recording the geographic position (GPS position) and the time at specified intervals;

b) Sending a call build-up signal via a base transmission station (BTS) to the mobile station or vice-versa at specified time intervals and storing the GPS position with each call build-up signal;

c) Recording of signals sent at specified time intervals with time stamp between the base transmission station (BTS) and the respective mobile station, by means of a mobile radio analysis device;

d) Mixing together the recorded data of the mobile station with the recorded data of the mobile radio analysis device sorted according to time stamp;

e) Issuing the measured results by geographic position and time;

f) wherein the recorded data is sorted according to time stamp, with each of the signals recorded by the mobile radio analysis device being allocated that position which, by comparing the time stamps of the mobile station and of the mobile radio analysis device, is nearest to the position of the transmitted signal, and with each call build-up signal being indicated with the actual stored position;

g) wherein prior to combining the recorded data, clock pulses of the mobile station and the mobile radio analysis device are synchronized, taking into account the GPS clock pulse, the internal clock pulse of the mobile station and the PCM clock pulse of the measuring interface (Abis interface);

h) wherein each time stamp of the mobile station and the mobile radio analysis device according to the condition $$tx_{corr}=tx+(t_{GPS}-t_q)/n \cdot x$$

is corrected with $t_{GPS}$=time within a GPS period;
$t_q$=measured time during a GPS period;
n=number of intervals within a GPS period;
tx=a time stamp to be corrected;
$tx_{corr}$=corrected time stamp tx;
x=number of the interval within 1 . . . to n.

2. A method according to claim 1, wherein after synchronizing the mobile station and the mobile radio analysis device, the time stamps of an identical signal of the mobile station and the mobile radio analysis device are compared, and if there is a difference, the difference is added as a transmission delay to the time stamps of the mobile station, prior to combination.

3. A method according to claim 1 wherein the recorded data of the mobile station is transmitted to the mobile radio analysis device via the global system for mobile communication.

* * * * *